United States Patent [19]

Anglerot

[11] Patent Number: 4,729,888

[45] Date of Patent: Mar. 8, 1988

[54] PROCESS OF RECOVERY OF SULPHUR FROM MINERALS CONTAINING PYRITES

[75] Inventor: Didier Anglerot, Pau, France

[73] Assignee: Societe Nationale Elf Aquitaine, France

[21] Appl. No.: 38,620

[22] Filed: Apr. 15, 1987

[30] Foreign Application Priority Data

Apr. 17, 1986 [FR] France .................. 86 05500

[51] Int. Cl.$^4$ .................. B01D 11/02; C01B 17/033; C01B 17/06; C01G 49/00
[52] U.S. Cl. .................. 423/578 A; 23/299; 423/29; 423/47; 423/87; 423/150; 423/153; 423/567 A
[58] Field of Search .................. 23/293 S, 308 S, 299; 423/29, 153, 154, 567 A, 578 A, 578 R, 87, 150, 47, 110, 36, 42, 106, 109, 146

[56] References Cited

U.S. PATENT DOCUMENTS

| | | | |
|---|---|---|---|
| 635,199 | 10/1899 | Smith | 423/29 |
| 2,118,140 | 5/1938 | Beattie | 423/578 A |
| 2,898,197 | 8/1959 | Forward et al. | 423/36 |
| 3,053,651 | 9/1962 | McGauley | 423/154 |

FOREIGN PATENT DOCUMENTS

| | | | |
|---|---|---|---|
| 222380 | 11/1957 | Australia | 423/578 |
| 2044460 | 3/1972 | Fed. Rep. of Germany | 423/578 |
| 1224247 | 3/1971 | United Kingdom | 423/578 A |

Primary Examiner—John Doll
Assistant Examiner—Jeffrey E. Russel
Attorney, Agent, or Firm—Ostrolenk, Faber, Gerb & Soffen

[57] ABSTRACT

Production of elementary sulphur from an iron sulphide mineral, which comprises oxidizing acid lixiviation of the pulverized mineral, for extraction of the sulfur. The pulp obtained from the lixiviation is treated in the hot with an organic solvent for sulphur, the solvent having a density higher than 1, to separate this pulp into an aqueous phase containing in solution the non-ferrous metals, the sulphates of which are water soluble, and into a suspension of the solid of the pulp in an organic phase consisting of a solution of sulphur in the solvent separated by decantation and, after separation of the solid in suspension in the organic phase, the sulphur is recovered by crystallization after cooling of the organic phase.

20 Claims, No Drawings

PROCESS OF RECOVERY OF SULPHUR FROM MINERALS CONTAINING PYRITES

The invention relates to a process for the preparation of elementary sulphur from minerals containing iron sulphides, particularly pyrites and pyrrhotine; it relates to a sequence of chemical operations for liberation of the sulphur from these sulphides. Such minerals can in general contain other minerals, in particular compounds of Cu, Zn, Pb, Au, Ag, As, etc., so that the process of the invention applies to the recovery of these useful elements at the same time as the sulphur.

The extraction of sulphur in the elementary state from sulphided minerals and in particular from pyrites is known and has given rise to a number of studies during the last three decades. Reference can be made to the prior art in U.S. Pat. No. 2898197, which describes the oxidizing lixiviation of minerals containing pyrrhotic sulphides and the subsequent recovery of the sulphur liberated, as well as the non-ferrous metals. However, the known technique leaves much to be desired from the standpoint of economics and also from practical execution. In fact, as the oxidising lixiviation leads to the formation of a finely divided solid phase containing the sulphur, in suspension in a liquid phase, which contains the non-ferrous metals in solution, it is difficult to separate these metals from the divided solid, because of the difficulties of filtration of the latter.

The present invention relates to a marked improvement in effecting the recovery of sulphur and the other useful elements by oxidising lixiviation, which allows this recovery to be carried out more conveniently than in the past and with better yields.

The process according to the invention is particularly well suited to the recovery of sulphur in arseniferous minerals and also it makes more economical the recovery of the metals copper and zinc. Moreover, the sulphur obtained by this process is of excellent quality.

The process according to the invention applies to various minerals principally containing the sulphides of iron of the pyrites type $FeS_2$ and/or pyrrhotine FeS, which can contain various other minerals as indicated above. Generally, the mineral contains 30 to 40% of Fe, 30 to 53% of S and can contain variable quantities of the other elements.

When the mineral contains pyrites $FeS_2$, the process comprises first a calcination of the crushed mineral in a generally non-oxidising atmosphere and recovery of the sulphur volatilised by this heating step. This operation is based on the decomposition of the pyrites present according to the reaction:

It is not useful when the mineral is entirely pyrrhotic and practically free from $FeS_2$.

For minerals containing carbonates or oxides capable of being reduced by the sulphur vapour, the calcination gives rise to a certain proportion of $SO_2$ which is employed for the production of sulphuric acid which is then used in one or more of the subsequent stages of the process. When the mineral does not contain compounds reducible by the sulphur vapour and thus does not theoretically allow the formation of $SO_2$ during the calcination, it is possible nevertheless to produce the desired quantity of $SO_2$ by carrying out this calcination in the presence of a controlled quantity of oxygen. The reaction $FeS_2 + O_2 \rightarrow FeS + SO_2$ is exothermic which also allows a substantial improvement in the thermal balance of the calcination of the mineral.

The powder resulting from the calcination which no longer contains pyrrhotine (FeS) nor iron sulphide, and possibly the oxides, is put into suspension in acidic water and heated in an autoclave under oxygen or air pressure until there is no longer formation of elementary sulphur. The principal reaction in this lixiviation can be written diagrammatically.

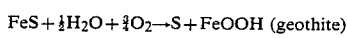

The non-ferrous metals, particularly Cu and Zn pass into aqueous solution, while the noble metals Au, Ag remain in the solid phase.

When the calcination of the mineral leads to the formation of a certain quantity of $SO_2$, which is transformed into sulphuric acid, the water necessary for lixiviation of the calcined mineral can advantageously consist of a solution at the desired concentration of at least a part of the sulphuric acid so obtained.

The product resulting from the lixiviation consists of a pulp of a solid which contains the sulphur and if present in the mineral the precious metals such as Au and Ag, and arsenic; the aqueous phase of the pulp contains in solution metals such as Cu and Zn. This pulp is subjected to a pressure substantially equal to the atmospheric pressure, and then undergoes a treatment for separation of the sulphur and the metals which it contains.

The treatment consists in adding to the pulp a solvent for sulphur having a density greater than 1 and then decanting the mixture resulting from this treatment, to separate the supernatent aqueous phase, which contains the metals Cu and Zn in solution from the suspension of the solid in the solvent in which the sulphur is dissolved. This stage of the process realises the main aim of the invention, namely extraction of the sulphur.

The suspension so obtained of the solid in the solvent which has dissolved the sulphur is subjected to a decantation and/or to a filtration, to separate the solid from the solvent charged with sulphur. The solvent, the temperature of which is about 80° to 100° C., is subjected if required to a dearsenification treatment and then cooled to recover the sulphur by crystallisation.

When the mineral contains arsenic, the sulphur formed during the calcination can be added to the solvent charged with the sulphur before the dearsenification treatment. It is more advantageous however to introduce this sulphur into the suspension subjected to lixiviation, because such a form of operation leads to an irreversible fixation of the major part of the arsenic entrained with the sulphur on goethite.

Solvents suitable for treating the pulp obtained from the lixiviation are in particular halogenated hydrocarbons, such as dichlorobenzene, dichloromethane, trichloromethane, dichlorethylene, trichloroethylene and particularly perchloroethylene. They allow all the sulphur to be easily dissolved in the hot from the wet residue from the lixiviation and thus to separate the gangue without difficulty. It is found in fact that with solvents having a density higher than 1, according to the invention, this unexpected result is obtained for iron oxides, particularly goethite, $Fe_2O_3.H_2O$, which goes into suspension in the solvent and the aqueous phase can be easily separated by decantation. In contrast, when the solvent has a density lower than 1, the goethite remains in suspension in the aqueous phase and filtration is thus rendered particularly difficult.

As the mineral can contain useful contents of other metals indicated above, it is important to carry out the recovery of the latter in the most economical conditions possible. Thus it is suitable to treat the aqueous solution separated after the second stage, that is after the oxidising lixiviation, for extraction of Cu and Zn. However, because of this lixiviation, the solution contains $Fe^{+++}$ recovery of the non-ferrous metals, irrespective of the mode of operation used, for example electrolysis, precipitation with a more electropositive metal powder or with a reactant such as $H_2S$ or others. According to a feature of the present invention, $Fe^{III}$ is reduced to $Fe^{II}$ in the solution resulting from the oxidising lixiviation, before subjecting it to various treatments for extraction of the non-ferrous metals. This reduction can be realised by any known means, particularly by the addition of a suitable reducing agent which is economically viable, such as for example $SO_2$, $H_2S$ or an organic substance.

However, a preferred embodiment which is particularly of interest because of the cost of the process, consists in utilising as the reducing agent iron monosulphide, particularly FeS. This compound can be taken in the form of natural pyrrhotine, that is a mineral practically not containing $FeS_2$. It can also be constituted by a portion of the calcined mineral powder which no longer contains pyrrhotine obtained in the first stage of the process explained above. A characteristic of the invention consists thus in utilising a purely pyrrhotic mineral, or taking a portion of the calcined powder in the first stage of the process and mixing and heating it with the filtered solution after the oxidising lixiviation, which constitutes the second stage of the process. The quantity of calcined powder to be utilised is calculated on the basis of the content of ferric compounds in the solution resulting from the oxidising lixiviation.

According to the nature of the non-ferrous metals which can be contained in the initial mineral, the reduced solution as indicated above is subjected to treatments known per se for their extraction.

The following summarises the preferred conditions for carrying out the process according to the invention.

Examples of the composition of the mineral:

Particle size range of the treated powder is below 3 mm and particularly ranging from 20 to 100 μ:

I. Preliminary calcination: 600° to 900° C. or preferably 750° to 850° C.; for 15 to 60 minutes with recovery of the sulphur released.

II. Use of a portion (I-C) of the calcined powder for its subsequent use in the reduction of $Fe^{III}$ in the solution derived from the oxidisin9 lixiviation: 5 to 15%, in general 8 to 10% of this powder. Proportion of water for the lixiviation:

1.2 to 2 times the weight of the powder.

Acidity of this water expressed as equivalents of acid per liter, 0.7 to 1.5 and preferably 0.9 to 1.1; (expressed as $H_2SO_4$:44 to 54 g/l).

Temperature of heating in an autoclave:

100° to 120° C., preferably 105° to 115° C.

Air pressure: 5 to 30 bars.

Duration: 2 to 6 hours.

A suspension (pulp) IIA and a solution IIB are thus obtained.

III. Treatment of the pulp IIA by the sulphur solvent.

Organic solvent, particularly an aromatic or aliphatic hydrocarbon, preferably chlorinated aliphatic and especially perchloroethylene; 1 to 2 liters of solvent per kg of powder subjected to lixiviation according to II. Temperature as high as possible compatible with the boiling point of the solvent. Decantation in the hot.

IV. Treatment of the organic solution.

Decantation and/or filtration to separate the solid containing the precious metals from the solvent charged with sulphur, then recovery of the sulphur contained in the solvent by crystallisation, if required after dearsenification treatment. Re-use of the solvent to treat the pulp obtained from the lixiviation, after separating the sulphur crystallised from this solvent.

V. Reduction of $Fe^{III}$ in the solution II-B:

Addition to this solution of the portion I-C and heating to 70°–90° C. for 30 to 90 minutes. Separation of the solid by decantation.

VI. Recovery of the copper:

The solution II-B, reduced according to V is subjected to a known treatment for extraction of the copper. It is particularly practical to agitate this solution with Fe powder in a substantially stoichiometric proportion, then separate the Cu cement formed, leaving a solution VI-B.

VII. Extraction of zinc:

After neutralisation or dilution of the solution VI-B, the Zn is precipitated in the form of sulphide by bubbling $H_2S$ into this solution. Preferably, the $H_2S$ is obtained by the attack on a part of the powder of the calcined mineral with sulphuric acid and in particular by sulphuric acid produced from the $SO_2$ liberated during the calcination of the mineral.

VIII. Extraction of gold and silver:

The solid phase obtained from dissolution of the sulphur with the organic solvent is treatment with milk of lime and then with an alkaline cyanide solution, preferably about 3 g of NaCN/liter.

The dearsenification of the sulphur in solution in the organic solvent can be effected by using any technique known for this purpose. For example, this solution can be contacted with a product such as solid lime which fixes arsenic in an irreverisble manner or passing this solution through an adsorbent bed, such as silica, clay, alumina, an adsorbent which can be regenerated for example by elution with the aid of an alkaline solution. Also, the arsenic can be extracted from the sulphur in solution in the organic solvent by washing the organic solution by means of an aqueous alkaline solution, for example milk of lime or dilute caustic soda or ammonia solution.

The invention is illustrated non-limitatively by the Examples which follow:

EXAMPLE 1

A pyritic mineral in the form of a powder having a particle size below 80μ is treated, containing:

| Fe | 38.7% | 500 ppm | As |
| S | 45.1 | 12 ppm | Ag |
| Zn | 1.11 | 1.9 ppm | Au |
| Cu | 0.58 | | |

1200 g of this powder are subjected to calcination under a nitrogen atmosphere at 800° C. for ½ hour. The gases released during this heating are condensed; thus 239 g of sulphur is recovered having an arsenic content of 1300 ppm. After cooling 959 g of powder which has undergone this thermal treatment, 90 g is taken in order to be utilised in a reducing reaction in a subsequent stage, while the remaining 869 g is mixed with 1500 g of water and 70 g of sulphuric acid of 66° Bé, namely 96% by weight.

This suspension is placed in an autoclave, taken to 110° C. and then air is introduced under a pressure of 20 bars; the powder is then allowed to react with the sulphuric solution with agitation for 3 h. The suspension is then left which reduces the temperature to about 90° C., and then mixed with 2500 ml of perchloroethylene. The resultant mixture is decanted. Two products are thus formed:

A—An aqueous solution containing the metals Cu and Zn, the temperature of which is about 90° C., and B—A suspension of a solid containing the precious metals in the solvent which dissolved the sulphur liberated by the lixiviation, as well as a part of the arsenic.

Treatment of solution A

As this solution contains trivalent iron, which generates subsequent precipitation of copper and zinc, there is added to this solution 90 g of the calcinate previously put aside, which is then agitated and heated at 80° C. for 1 hour.

After decantation, the solution recovered is free from trivalent iron and it can then be subjected to separation of the copper and the zinc.

By the addition of 4.7 g of iron powder to this solution, 5.2 g of copper is recovered for a copper yield of 74.7% of the initial mineral.

The solution remaining after separation of the copper and thus having a pH of about 2, is treated with $H_2S$ derived from reaction of a part of the calcined material with sulphuric acid. 17 g of ZnS is thus recovered which represents a recovery of the zinc of 85.6% over the initial mineral.

Treatment of the suspension B

This suspension is filtered to separate the solid in the solution of the sulphur in the perchlorethylene. To the solution of the sulphur obtained, sulphur liberated during the calcination at 800° C. of the initial mineral is added. When the sulphur has dissolved, the solution obtained contains 550 ppm of arsenic with respect to the sulphur. There is then added to the solution 500 ml of 0.1N caustic soda and this is allowed to agitate for 1 hour with a view to elimination of the arsenic; the aqueous layer containing the arsenic is then separated from the solution of the sulphur in the perchloroethylene by decantation. After cooling the latter, the sulphur crystallises and is free from arsenic. The soda solution is passed through a lime bed which fixes the arsenic. In fact, the sulphur has been obtained with a yield of 92% with respect to the total sulphur of the initial mineral.

The solid resulting from the filtration of the suspension B is treated for recovery of the gold and silver. For this, the solid is treated with milk of lime and then with a solution of 3 g/l sodium cyanide; this solution dissolves 87% of the gold and 35% of the silver present. Before being discarded, the residual solid is treated with hydrogen peroxide to destroy the cyanide ions.

EXAMPLE 2

The operations described in Example 1 have been applied to a mineral which contains:

| Fe | 44% | Pb | 0.48% |
|---|---|---|---|
| S | 34 | As | 0.23% |
| C | 2.3 | Ag | 34 ppm |
| Cu | 0.62 | Au | 1.38 ppm |
| Zn | 2.24 | | |

The calculated distribution of the iron compounds amounts to

| $FeS_2$ | 50.3% |
|---|---|
| FeS | 15.4% |
| $FeCO_3$ | 22.2% |

By calcination 9% of the initial sulphur is transformed into $SO_2$ because of the presence of the carbonate and this $SO_2$ is utilised to produce the sulphuric acid. The major part of this acid is employed in the lixiviation stage of the calcined mineral and the remainder serve to form the $H_2S$ necessary for precipitation of the ZnS by reaction with a part of the calcined mineral. Also, the sulphur liberated from the calcination is introduced into the suspension of the calcined mineral entering the autoclave and is not added to the solution of the sulphur obtained after filtration of the suspension B; as a result, the solution of the sulphur produced does not contain more than 30 ppm of arsenic with respect to the sulphur.

In this Example, the sulphur has been obtained with a yield of 82.4% with respect to the total sulphur of the mineral.

I claim:

1. Process of production of elementary sulphur from an iron sulphide mineral, which comprises the oxidizing acid lixiviation of the pulverized mineral for extraction of the sulphur, characterized in treating the pulp obtained from the lixiviation with an organic solvent for sulphur, the solvent having a density greater than 1, to separate the pulp into an aqueous phase containing in solution the non-ferrous metals, the sulphates of which are water soluble, and a suspension of the solid of the pulp in an organic phase comprising a solution of the sulphur in the solvent, separating the solid in suspension from the organic phase, and recovering the sulphur by crystallization after cooling the organic phase.

2. Process according to claim 1, characterized in that the solvent for the sulphur is a compound carrying an electro-negative group or atom.

3. Process according to claim 1, characterized in that the trivalent iron compounds present in the aqueous solution obtained from the lixiviation are reduced and then subjecting the solution to the extraction of the non-ferrous metals.

4. Process according to claim 1 characterized in that before the lixiviation, the mineral powder is calcined to convert the $FeS_2$ which it contains into pyrrhotine and the sulphur vaporised thereby is recovered.

5. Process according to claim 4, characterized in that the calcination of the mineral liberates $SO_2$ which is converted to sulphuric acid, and a part of this acid is utilised in the lixiviation stage.

6. Process according to claim 3, characterized in that reduction of the trivalent iron is effected by heating the solution obtained from the lixiviation with a powder containing FeS.

7. Process according to claim 3, characterized in that the reduced aqueous solution is treated with iron powder to precipitate copper.

8. Process according to claim 7, characterized in that the solution remaining after separation of the copper is subjected to precipitation of zinc in the form of the sulphide.

9. Process according to claim 8, characterized in that precipitation of the ZnS is effected with $H_2S$ formed by treatment of a pyrrhotic mineral by means of sulphuric acid.

10. Process according to claim 9, characterized in that the sulphuric acid utilised for production of the $H_2S$ which in turn is used for the precipitation of the ZnS is obtained by calcining the mineral prior to lixiviation and converting $SO_2$ produced thereby into sulphuric acid.

11. Process according to claim 1, characterized in that the mineral contains arsenic and that the organic phase comprising a solution of sulphur in the organic solvent is subjected to a dearsenification treatment before separating the sulphur by crystallisation.

12. Process according to claim 11, characterized in that the mineral is calcined before lixiviation and sulphur which is vapourised thereby is dissolved in the organic phase before subjecting the latter to the dearsenification treatment.

13. Process according to claim 11, characterized in that the mineral calcined contains sulphur which is vapourised during this calcining operation and the vapourised sulphur is added to the calcined mineral subjected to lixiviation.

14. Process according to claim 11, characterized in that the dearsenification treatment comprises washing the organic phase constituted by the solution of the sulphur in the organic solvent by means of an aqueous alkaline solution.

15. Process according to claim 1, characterized in that the solid residue from extraction of the sulphur by the organic solvent contains precious metals and that this solid is treated with milk of lime and then with an aqueous alkali cyanide solution for extraction of these metals.

16. Process according to claim 9 characterized in that the pyrrhotic mineral comprises said mineral product which has been calcined.

17. Process according to claim 6 characterized in that said powder containing FeS is a pyrrhotic mineral.

18. Process according to claim 2 characterized in that said solvent is a chlorinated hydrocarbon.

19. Process according to claim 1 characterized in that the solvent for the sulphur is perchloroethylene.

20. Process according to claim 19 characterized in that before the lixiviation, the pulverised mineral is calcined to convert the iron sulfide which it contains into pyrrhotine and the sulphur vapourised thereby is recovered and $SO_2$ liberated as a result of the calcination is converted into sulphuric acid and a part of such sulphuric acid is utilised in the lixiviation stage, and in that the trivalent iron compounds present in the aqueous solution obtained from the lixiviation are reduced followed by extracting the non-ferrous metals from the solution.

* * * * *